(12) United States Patent
Kalisz

(10) Patent No.: US 8,205,909 B2
(45) Date of Patent: Jun. 26, 2012

(54) ACTIVE KNEE BOLSTER FOR AUTOMOTIVE VEHICLE

(75) Inventor: Raymond Edward Kalisz, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 159 days.

(21) Appl. No.: 12/824,150

(22) Filed: Jun. 26, 2010

(65) Prior Publication Data

US 2011/0316300 A1    Dec. 29, 2011

(51) Int. Cl.
*B60R 21/045*    (2006.01)
*B60R 21/206*    (2011.01)

(52) U.S. Cl. .............. 280/752; 280/728.2; 280/728.3; 280/730.1; 280/732; 296/37.12; 296/187.05

(58) Field of Classification Search ............ 280/728.2, 280/728.3, 730.1, 732, 752, 753; 296/37.12, 296/187.05

See application file for complete search history.

(56) References Cited

U.S. PATENT DOCUMENTS

| | | | | |
|---|---|---|---|---|
| 5,190,314 A | * | 3/1993 | Takasugi | 280/752 |
| 5,413,379 A | * | 5/1995 | Koma | 280/752 |
| 5,476,283 A | * | 12/1995 | Elton | 280/753 |
| 5,630,621 A | * | 5/1997 | Schneider | 280/753 |
| 5,709,407 A | * | 1/1998 | Stephens et al. | 280/751 |
| 5,904,389 A | * | 5/1999 | Vaishnav et al. | 296/37.1 |
| 5,931,493 A | * | 8/1999 | Sutherland | 280/730.1 |
| 6,032,978 A | | 3/2000 | Spencer et al. | |
| 6,039,380 A | * | 3/2000 | Heilig et al. | 296/70 |
| 6,203,057 B1 | | 3/2001 | Spencer et al. | |
| 6,213,497 B1 | | 4/2001 | Spencer et al. | |
| 6,302,437 B1 | * | 10/2001 | Marriott et al. | 280/732 |
| 6,340,170 B1 | * | 1/2002 | Davis et al. | 280/730.1 |
| 6,431,600 B1 | * | 8/2002 | Freisler et al. | 280/751 |
| 6,712,385 B2 | * | 3/2004 | Enders | 280/730.1 |
| 6,758,493 B2 | | 7/2004 | Conlee et al. | |
| 6,817,627 B2 | * | 11/2004 | Galmiche et al. | 280/730.1 |
| 6,905,136 B2 | | 6/2005 | Vidal et al. | |
| 6,951,348 B2 | * | 10/2005 | Enders | 280/728.2 |
| 6,971,667 B2 | * | 12/2005 | Enders et al. | 280/730.1 |
| 6,991,252 B2 | * | 1/2006 | Enders | 280/728.1 |
| 7,213,840 B2 | * | 5/2007 | Kumagai | 280/752 |
| 7,393,011 B2 | * | 7/2008 | Keshavaraj | 280/743.2 |
| 7,654,557 B2 | * | 2/2010 | Enders | 280/728.2 |
| 7,810,837 B2 | * | 10/2010 | Thomas et al. | 280/730.1 |
| 2007/0176399 A1 | * | 8/2007 | Kullack | 280/728.3 |

FOREIGN PATENT DOCUMENTS

WO    WO 2006017131 A2    2/2006

* cited by examiner

*Primary Examiner* — Paul N Dickson
*Assistant Examiner* — Laura Freedman
(74) *Attorney, Agent, or Firm* — Jerome R. Drouillard; Greg P. Brown

(57) ABSTRACT

An active knee bolster for an automotive vehicle has a base which is attached to a supporting structure, such as a glove box. The base has an outer periphery and an inner field containing a number of frangible attachment tabs. A combination inflatable bladder and cover is attached to the frangible attachment tabs such that the tabs tear partially free, and effectively become hinged from, the base when the bladder is inflated.

6 Claims, 3 Drawing Sheets

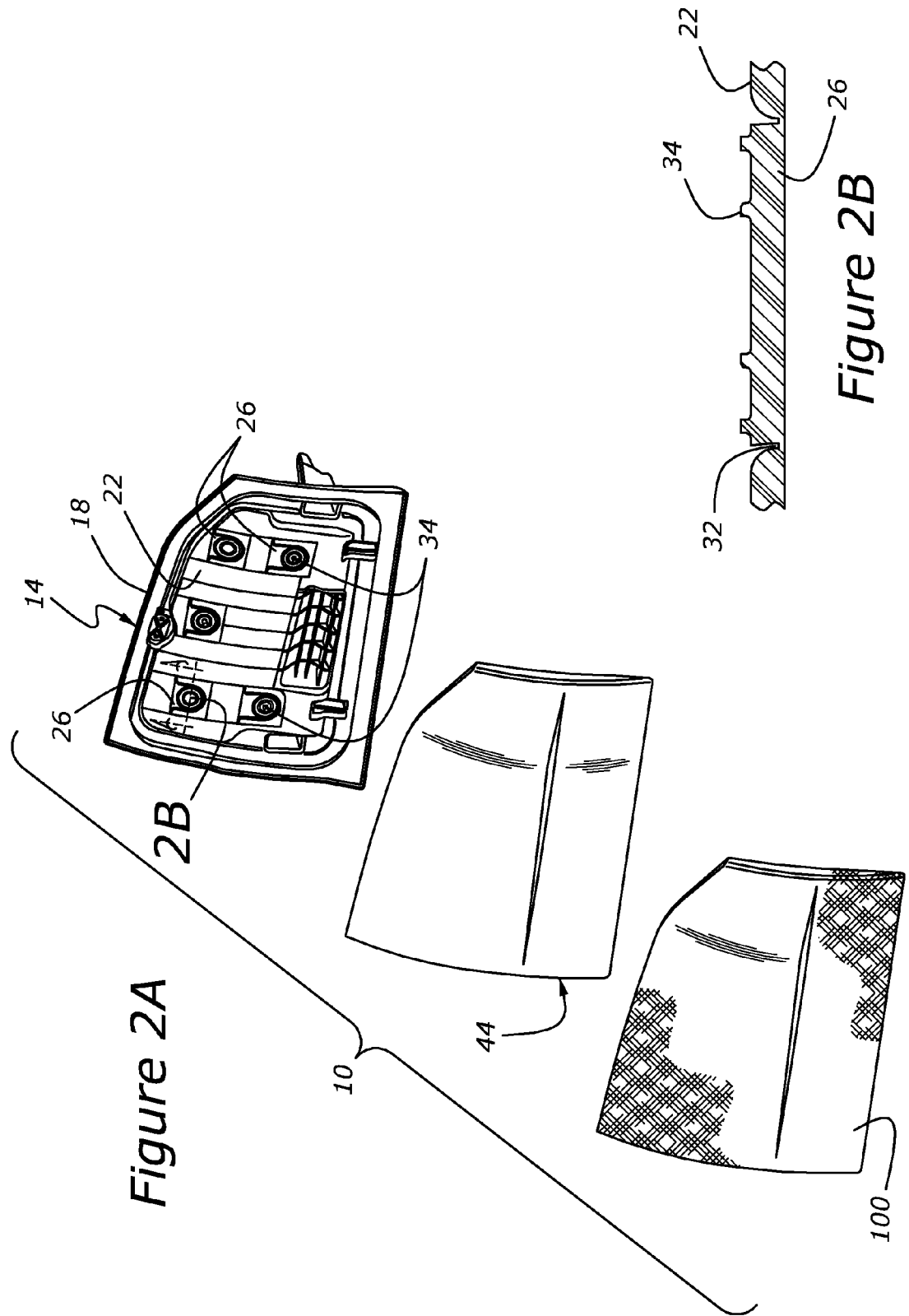

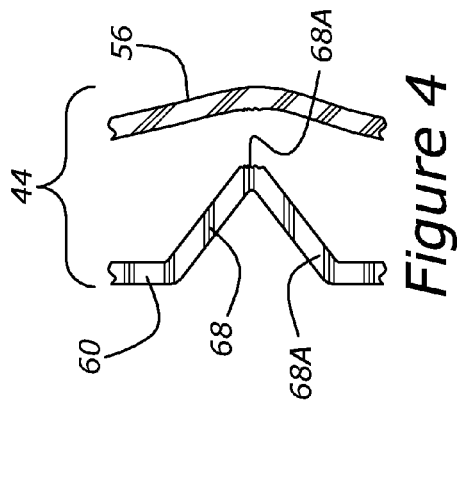
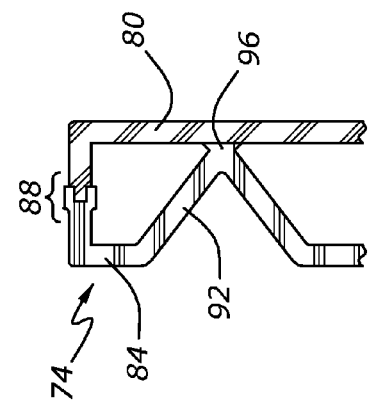
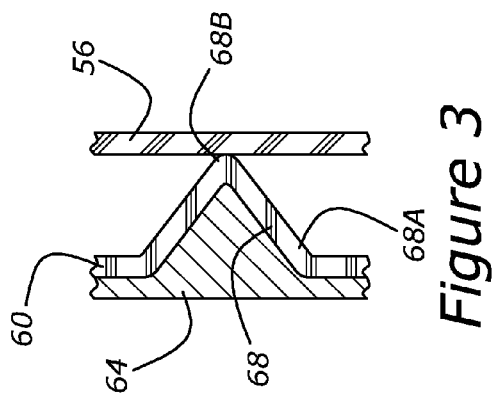
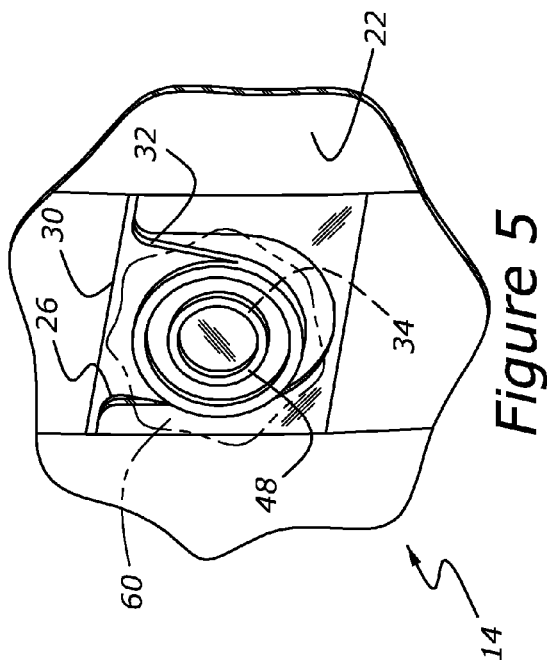

ACTIVE KNEE BOLSTER FOR AUTOMOTIVE VEHICLE

TECHNICAL FIELD

This invention is related to an automotive vehicle occupant protection device having a gas-inflatable element.

BACKGROUND

The management of vehicular occupants during collisions has given rise to a plethora of energy handling devices. Knee bolsters are one such device. Because of space limitations within the confines of vehicular passenger compartments, it is desirable to utilize the glove box door as a knee bolster. This dual role necessitates that the door function without undesirable vibration and without degraded appearance and tactile cues, while not weighing an excessive amount.

It would be desirable to provide an active knee bolster for use in an automotive vehicle, with the knee bolster being not only light in weight and visually attractive, but also being characterized by structural integrity giving excellent tactile feel and resistance to unwanted vibration.

SUMMARY

According to an aspect of the present invention, an active knee bolster, which may be configured in a preferred embodiment as a hinged door for a vehicular glovebox, includes a base attached to a supporting structure, with the base having an outer periphery and an inner field bearing a number of frangible attachment tabs. A combination inflatable bladder and cover is attached to the frangible attachment tabs, which are configured to fracture and thereby become hinged from the base if the inflatable bladder is inflated.

According to another aspect of the present invention, the base of the present active knee bolster may be formed from molded plastic, such as blow molded polyethylene, with the combination inflatable bladder and cover including a molded plastic bladder with a front wall configured as a cover, and a back wall, and with the bladder having a number of frangible interconnections molded between and attaching the front wall and the back wall, whereby the frangible interconnections will be broken if the inflatable bladder is inflated. The frangible interconnections are generally one-piece with the front wall and the back wall, with the interconnections being generally conical, and with each having a base incorporated in one of the front wall and the back wall, and an apex incorporated in the other of the front wall and the back wall.

According to another aspect of the present invention, the active knee bolster of the present invention may utilize an inflatable bladder formed from two injection molded plastic shells welded into a unitary bladder. The frangible interconnections between the molded plastic shells may be welded simultaneously with the outer periphery of the shells.

According to another aspect of the present invention, a glove box for an automotive vehicle includes a storage cavity and an active knee bolster door attached to the storage cavity, with the active knee bolster door including a molded plastic base pivotably attached to the storage cavity, and a plastic, inflatable bladder bonded to a plurality of frangible attachment tabs formed in the base, wherein the inflatable bladder has a back wall and a front wall configured as a cover for the door.

It is an advantage of an active knee bolster according to the present invention that the knee bolster is not only light in weight and visually attractive, but also characterized by structural integrity giving excellent tactile feel and resistance to unwanted vibration during normal use, coupled with the ability to deploy during specified events.

Other advantages, as well as features of the present invention, will become apparent to the reader of this specification.

DESCRIPTION OF DRAWINGS

FIG. 2 is an inward-looking exploded perspective view of a knee bolster glove box door system according to an aspect of the present invention.

FIG. 3 is partial section through an internally reinforced inflatable bladder incorporated in a knee bolster according to an aspect of the present invention.

FIG. 4 shows the section of FIG. 3, following inflation of the knee bolster's pressure bladder. The interconnection between the bladder's front wall and back wall is fractured during the inflation process.

FIG. 5 shows a fractured attachment tab hinged to the knee bolster's base, following inflation of the bladder.

FIG. 6 shows a portion of an injection molded inflatable bladder, including a frangible interconnection which is welded between the front wall and back wall of the bladder according to an aspect of the present invention.

DESCRIPTION OF INVENTION

Figure 1:
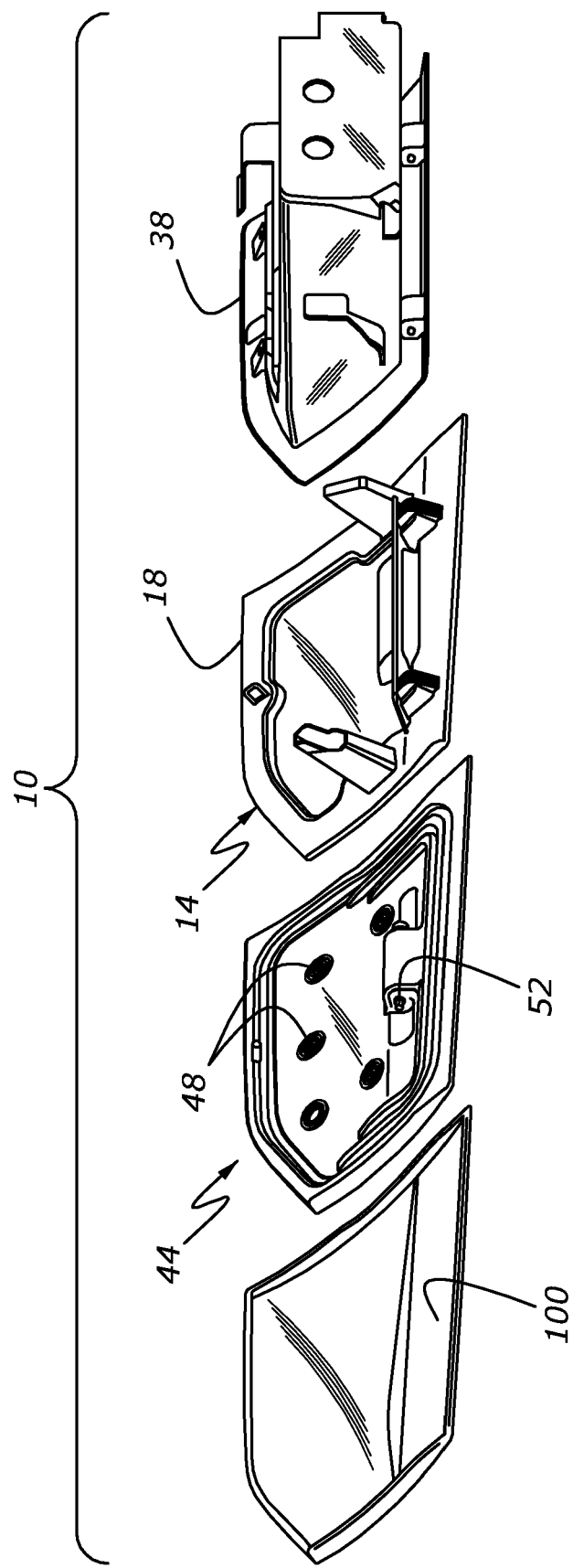
FIG. 1 is an outward-looking exploded perspective view of an active knee bolster glove box door system according to an aspect of the present invention.

As shown in FIG. 1, an active knee bolster system according to an aspect of the present invention has a base, 14, which forms the foundation for the bolster. Base 14 may be either attached by hinging to a storage cavity such as a glove box, which is shown at 38 in FIG. 1, or mounted to another structure, such as an instrument panel support, at a location, for example, below a steering column. Either location is accessible to the knees of an individual riding in a specified seating position within a vehicle.

Base 14 is preferably configured as an injection molded plastic part formed, from any one of hundreds of suitable polymers, such as thermoplastic olefin. Base 14 has an outer periphery, 18, and an inner field, 22. A number of frangible attachment tabs, 26, are formed in inner field 22 (FIG. 2A). Tabs 26 each have an undercut area, 32 (FIG. 2B), which fractures as described below, to leave tabs 26 attached to inner field 22 by a hinge, 30 (FIG. 5).

As first seen in FIG. 1, a combination inflatable bladder and cover, 44, is applied to base 14. Bladder 44 has a number of circular locating features, 48, formed in rear wall 60, which nest with corresponding locating features 34 formed in frangible attachment tabs 26 of base 14. Bladder 44 and base 14 are welded or bonded in the areas of features 48 and 34, and inflation of bladder 44 by inflator 52 during a collision causes tabs 26 to tear along undercut areas 32 (FIG. 5), so as to define hinge 30 of each tab. Frangible attachment tabs 26 provide stability for the entire inner, or field, portion of support bladder and cover 44. This is particularly important during normal use because rigorous support avoids unwanted flexibility of bladder 44 during opening and closing of a glovebox door including the bladder.

Combination inflatable bladder and cover 44 may be configured either as a blow molded structure, such as from polyethylene, or as a welded injection molded assembly. In either case, bladder 44 is stiffened by the presence of a number of pyramids or cones which are molded as one-piece with either front wall 56 or rear wall 60 of bladder 44. FIG. 3 shows a conical frangible, stiffening interconnection, 68, formed by a blow molding tool, 64, in rear wall 60 of bladder 44. Base 68A of conical interconnection 68 is one-piece with rear wall 60, and apex 68B of interconnection 68 is one piece with front wall 56. FIG. 4 shows a fracture, or separation, between apex 68B and front wall 56 after inflation of bladder 44 by inflator 52.

In the embodiment of FIG. 6, injection molded inflatable bladder and cover 74 has a welded joint, 88, extending about its outer periphery, which joins front wall 80 to rear wall 84 into a unitary bladder. A number of stiffening interconnections, 92, are provided, with each extending between rear wall 84 and front wall 80. Each of interconnections 92 has a frangible weld, 96, to front wall 80, with weld 96 being configured so as to cause weld 96 to fracture, or separate, when bladder 74 is inflated.

An outer skin, 100 (FIGS. 1 and 2), may be applied optionally to either bladder 44 or 74. In a preferred embodiment, skin 100 is constructed of plastic, which may be a vacuum formed thermoplastic bilaminate, grained or otherwise finished, and selected from a class of such materials known to those skilled in the art and suggested by this disclosure. In other preferred embodiments, bladders 44 and 74 may themselves have a surface treatment such as wood graining, or other finishes which are visually attractive. In any event, the present knee bolster will exhibit excellent tactile cues and resistance to unwanted vibration because of the inner reinforcement provided by the frangible interconnections.

While particular embodiments of the invention have been shown and described, numerous variations and alternate embodiments will occur to those skilled in the art. Accordingly, it is intended that the scope of the invention be limited only in terms of the appended claims.

What is claimed is:

1. An active knee bolster, comprising:
    a base attached to a supporting structure, with said base having an outer periphery and an inner field with a plurality of frangible attachment tabs; and
    a combination inflatable bladder and cover attached to said plurality of frangible attachment tabs wherein said base is formed from molded plastic and said combination inflatable bladder and cover comprises a molded plastic bladder with a front wall configured as a cover, and a back wall, and with said bladder having a plurality of frangible interconnections molded between and attaching said front wall and said back wall, whereby said frangible interconnections will be broken if said inflatable bladder is inflated, and wherein said frangible interconnections are generally one-piece with said front wall and said back wall, and with said interconnections being generally conical, with each interconnection having a base incorporated in one of said front wall and said back wall and an apex incorporated in the other of said front wall and said back wall.

2. The active knee bolster according to claim 1, wherein said base comprises a door member hingedly attached to a glove box of a vehicle.

3. The active knee bolster according to claim 1, wherein said combination inflatable bladder and cover is welded to said plurality of frangible attachment tabs.

4. The active knee bolster according to claim 1 wherein said inflatable bladder is blow molded from polyethylene.

5. The active knee bolster according to claim 1, wherein said supporting structure comprises an instrument panel of a vehicle.

6. An active knee bolster, comprising:
    a base attached to a supporting structure, with said base having an outer periphery and an inner field with a plurality of frangible attachment tabs; and
    a combination inflatable bladder and cover attached to said plurality of frangible attachment tabs, wherein said base and said combination inflatable bladder and cover are constructed from plastic, with said inflatable bladder being welded to said plurality of frangible attachment tabs, and with said frangible attachment tabs being configured to fracture and thereby become hinged from said base if said inflatable bladder is inflated.

* * * * *